(12) United States Patent
Ko et al.

(10) Patent No.: US 8,410,238 B2
(45) Date of Patent: Apr. 2, 2013

(54) BISHYDROXYARYLSILOXANE COMPOUND AND METHOD OF PREPARING THE SAME

(75) Inventors: Chang Hong Ko, Uiwang-si (KR); Min Soo Lee, Uiwang-si (KR); Sang Hyun Hong, Uiwang-si (KR); Beom Jun Joo, Uiwang-si (KR); Won Gi Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 159 days.

(21) Appl. No.: 12/980,422

(22) Filed: Dec. 29, 2010

(65) Prior Publication Data

US 2012/0053316 A1 Mar. 1, 2012

(30) Foreign Application Priority Data

Aug. 26, 2010 (KR) ........................ 10-2010-0083126

(51) Int. Cl.
*C08G 77/06* (2006.01)

(52) U.S. Cl. ................. 528/31; 528/29; 528/25; 528/35
(58) Field of Classification Search ..................... 528/25, 528/29, 31, 35
See application file for complete search history.

(56) References Cited

U.S. PATENT DOCUMENTS

| 3,189,662 A | 6/1965 | Vaughn, Jr. |
| 5,243,009 A | 9/1993 | Rich et al. |
| 6,072,016 A * | 6/2000 | Kobayashi et al. ............. 528/15 |

* cited by examiner

*Primary Examiner* — Margaret Moore
(74) *Attorney, Agent, or Firm* — Summa, Additon & Ashe, P.A.

(57) ABSTRACT

Disclosed is a bishydroxyarylsiloxane compound. The bishydroxyarylsiloxane compound has a novel structure in which a particular moiety is introduced between siloxane blocks. Due to this structure, the physical properties of a copolymer of the bishydroxyarylsiloxane compound and a polymer can be tuned. Further disclosed is a method for preparing the bishydroxyarylsiloxane compound.

22 Claims, 8 Drawing Sheets

BISHYDROXYARYLSILOXANE COMPOUND AND METHOD OF PREPARING THE SAME

CROSS-REFERENCE TO RELATED APPLICATIONS

This application claims priority under 35 USC Section 119 from Korean Patent Application No. 10-2010-0083126, filed Aug. 26, 2010, in the Korean Intellectual Property Office, the entire disclosure of which is incorporated herein by reference.

FIELD OF THE INVENTION

The present invention relates to a bishydroxyarylsiloxane compound and a method for preparing the same.

BACKGROUND OF THE INVENTION

A great deal of research has been conducted on methods for improving the chemical resistance and impact strength of polycarbonates by the use of siloxane monomers. However, these methods may result in a considerable deterioration in the transparency of polycarbonates due to incompatibility of the polycarbonates with siloxane monomers upon copolymerization.

Many efforts have been made to solve the problem of incompatibility between polycarbonates and siloxane monomers and to utilize the beneficial aspects of the silicon atoms of siloxane monomers in terms of chemical resistance and impact strength. For example, studies are currently being undertaken into the preparation of oligodimethylsiloxane-polycarbonate copolymers in which silicon atoms of the siloxane monomer are uniformly distributed in the polycarbonate.

U.S. Pat. No. 3,189,662 issued to Vaughn et al. discloses a method for preparing a copolymer of polycarbonate and a siloxane monomer in which bisphenol moieties are bound to both ends of polydimethylsiloxane. However, hydrolysis of the siloxane monomer is likely to occur after polymerization due to the unstable silicon-oxygen bonds connecting the siloxane and reactive moieties, leading to poor weather resistance and mechanical properties of the copolymer.

In attempts to solve such problems, there have been developed monomers with improved hydrolysis resistance in which propylphenylhydroxysiloxane blocks containing a silicon-carbon bond instead of a silicon-oxygen bond are linked. Monomers using silicon-aryl bonds have been developed in the early days (see U.S. Pat. No. 5,243,009). Since then, monomers with improved heat stability and hydrolysis resistance having silicon-alkyl bonds have been developed.

However, no methods have as yet been developed for the preparation of siloxane monomers in which various moieties such as alkyl are introduced between oligodimethylsiloxane blocks to achieve improved physical properties, for example, good resistance to heat and hydrolysis, because there are no successful synthetic methods for introducing new moieties between oligodimethylsiloxane blocks.

SUMMARY OF THE INVENTION

The present invention relates to a bishydroxyarylsiloxane compound having a novel structure in which a particular moiety is introduced between siloxane blocks, which can provide flexibility in selecting physical properties of a copolymer including the same.

The bishydroxyarylsiloxane compound is represented by Formula 1:

(1)

wherein:
$R_1$ and $R_2$ are each independently $C_1$-$C_{10}$ alkyl or $C_6$-$C_{18}$ aryl, optionally substituted with halogen or $C_1$-$C_6$ alkoxy,
each A is independently $C_1$-$C_{10}$ alkylene or $C_6$-$C_{18}$ arylene optionally including —O— or —S—,
Z is $C_1$-$C_{18}$ alkylene, $C_6$-$C_{18}$ cycloalkylene or $C_6$-$C_{18}$ arylene, optionally substituted with $C_1$-$C_6$ alkyl, $C_6$-$C_{18}$ aryl or halogen,
each Y is independently hydrogen, halogen, $C_1$-$C_{18}$ alkoxy, $C_1$-$C_{10}$ alkyl or $C_6$-$C_{18}$ aryl, and
each n is independently an integer from 4 to 100.

The present invention also provides a method for preparing the bishydroxyarylsiloxane compound of Formula 1. The method of the invention includes reacting a hydride terminated siloxane represented by Formula 2:

(2)

wherein:
$R_1$ and $R_2$ are each independently $C_1$-$C_{10}$ alkyl or $C_6$-$C_{18}$ aryl, optionally substituted with halogen or $C_1$-$C_6$ alkoxy, and
n is an integer from 4 to 100,
with a phenol derivative represented by Formula 3:

(3)

wherein:
B is $C_1$-$C_{10}$ alkylene or $C_6$-$C_{18}$ arylene having a terminal double bond optionally including —O— or —S—, and Y is hydrogen, halogen, $C_1$-$C_{18}$ alkoxy, $C_1$-$C_{10}$ alkyl or $C_6$-$C_{18}$ aryl, to synthesize a monohydroxyarylsiloxane compound represented by Formula 4:

$$HO-\underset{Y}{\underset{|}{C_6H_4}}-A-CH_2CH_2-\underset{R_2}{\overset{R_1}{\underset{|}{\overset{|}{Si}}}}-\left[O-\underset{R_2}{\overset{R_1}{\underset{|}{\overset{|}{Si}}}}\right]_n-H \quad (4)$$

wherein:
$R_1$, $R_2$ and n are as defined in Formula 2,
A is $C_1$-$C_{10}$ alkylene or $C_6$-$C_{18}$ arylene optionally including —O— or —S—, and
Y is as defined in Formula 3; and
reacting the monohydroxyarylsiloxane compound with a diene.

BRIEF DESCRIPTION OF THE DRAWINGS

The above and other features of the present disclosure will become apparent from the detailed description of the following embodiments in conjunction with the accompanying drawings:

FIGS. 1 and 2 are NMR and IR spectra, respectively, of bishydroxyoligodimethylsiloxane A prepared in Example 1;

FIGS. 3 and 4 are NMR and IR spectra, respectively, of bishydroxyoligodimethylsiloxane B prepared in Example 2;

FIGS. 5 and 6 are NMR and IR spectra, respectively, of bishydroxyoligodimethylsiloxane C prepared in Example 3;

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Exemplary embodiments of the present disclosure will now be described in detail with reference to the accompanying drawings.

A description of details apparent to those skilled in the art will be omitted herein for clarity.

The present invention provides a bishydroxyarylsiloxane compound represented by Formula 1:

wherein:

$R_1$ and $R_2$ are each independently $C_1$-$C_{10}$ alkyl or $C_6$-$C_{18}$ aryl, optionally substituted with halogen or $C_1$-$C_6$ alkoxy, each A is independently $C_1$-$C_{10}$ alkylene or $C_6$-$C_{18}$ arylene, optionally including —O— or —S—, Z is substituted or unsubstituted $C_1$-$C_{18}$ alkylene, $C_6$-$C_{18}$ cycloalkylene or $C_6$-$C_{18}$ arylene, each Y is independently hydrogen, halogen, $C_1$-$C_{18}$ alkoxy, $C_1$-$C_{10}$ alkyl or $C_6$-$C_{18}$ aryl, and each n is independently an integer from 4 to 100.

The term "alkyl" as used herein is intended to include both linear alkyl and branched alkyl groups.

In exemplary embodiments of the present invention, $R_1$ and $R_2$ in Formula 1 are each independently $C_1$-$C_6$ alkyl, for example, $C_1$-$C_3$ alkyl, and as another example, each of $R_1$ and $R_2$ can be methyl.

In exemplary embodiments of the present invention, each A in Formula 1 is $C_1$-$C_6$ alkylene, for example, $C_1$-$C_3$ alkylene, and as another example each A can be methylene. In exemplary embodiments of the present invention, Z in Formula 1 can be substituted or unsubstituted $C_1$-$C_{10}$ alkylene, $C_6$-$C_{10}$ cycloalkylene or $C_6$-$C_{10}$ arylene. Exemplary substituents for Z may include $C_1$-$C_6$ alkyl, $C_6$-$C_{18}$ aryl and halogen. In exemplary embodiments of the present invention, Z can be substituted with $C_1$-$C_6$ alkyl, for example $C_1$-$C_3$ alkyl.

Each of the Si atoms of the Si—Z—Si linkage in Formula 1 may be directly bonded to Z or may be bonded to the substituent of Z.

In exemplary embodiments of the present invention, each Y in Formula can independently be hydrogen or $C_1$-$C_3$ alkoxy, for example, hydrogen or methoxy.

The number of Y on each of the benzene moiety may be from 1 to 4, for example 1 or 2.

Each Y may be bonded to the 2-, 3-, 5- or 6-position of the benzene ring, for example, each Y can be bonded to the 3-position of the benzene ring.

Each n in Formula 1 can independently bean integer from 20 to 50, for example, an integer from 20 to 40.

Specific exemplary bishydroxyarylsiloxane compounds include, but are not limited to, the following compounds:

$$HO-\underset{Y}{C_6H_4}-A-CH_2CH_2-\underset{R_2}{\overset{R_1}{\underset{|}{\overset{|}{Si}}}}-\left[O-\underset{R_2}{\overset{R_1}{\underset{|}{\overset{|}{Si}}}}\right]_n-Z-\left[\underset{R_2}{\overset{R_1}{\underset{|}{\overset{|}{Si}}}}-O\right]_n-\underset{R_2}{\overset{R_1}{\underset{|}{\overset{|}{Si}}}}-CH_2CH_2-A-\underset{Y}{C_6H_4}-OH \quad (1)$$

These compounds have a structure in which a moiety, such as alkyl, aryl or cycloalkyl, is introduced between the siloxane blocks. This introduction enables the advent of new siloxane monomers, which have not previously been published.

The compound of Formula 1 has terminal hydroxyl groups, which are polymerizable with a polymer, such as polycarbonate, polyester or polyphosphate. Due to the presence of the terminal hydroxyl groups, the compound of Formula 1 can be used as a siloxane monomer, which can be copolymerized with the polymer to prepare a copolymer. The moiety, such as alkyl, aryl or cycloalkyl, introduced between the siloxane blocks can function to tune the physical properties of the siloxane-polymer copolymer or to impart new physical properties to the siloxane-polymer copolymer. That is, the siloxane monomer of Formula 1 can contribute to the preparation of siloxane-polymer copolymers with improved physical properties or siloxane-polymer copolymers imparted with new physical properties.

Such physical properties include, but are not limited to, heat resistance, hydrolysis resistance, chemical resistance, impact resistance and flame retardancy. Specifically, the bishydroxyarylsiloxane compound of Formula 1 can be used to improve the chemical resistance or impact resistance of polycarbonate resins and can be added to polyphosphate resins to yield novel flame retardants benefiting from the physical properties of silicon.

The present invention further provides a method for preparing the compound of Formula 1.

The method includes reacting a hydride terminated siloxane represented by Formula 2:

(2)

wherein $R_1$ and $R_2$ are each independently $C_1$-$C_{10}$ alkyl or $C_6$-$C_{18}$ aryl, optionally substituted with halogen or $C_1$-$C_6$ alkoxy, and n is an integer from 4 to 100, with a phenol derivative represented by Formula 3:

(3)

wherein B is $C_1$-$C_{10}$ alkylene or $C_6$-$C_{18}$ arylene having a terminal double bond, optionally including —O— or —S—, and Y is hydrogen, halogen, $C_1$-$C_{18}$ alkoxy, $C_1$-$C_{10}$ alkyl or $C_6$-$C_{18}$ aryl, to synthesize a monohydroxyarylsiloxane compound represented by Formula 4:

(4)

wherein $R_1$, $R_2$ and n are as defined in Formula 2, A is $C_1$-$C_{10}$ alkylene or $C_6$-$C_{18}$ arylene, optionally including —O— or —S—, and Y is as defined in Formula 3 ('first step'); and reacting the monohydroxyarylsiloxane compound with a diene ('second step').

First Step

In this step, the hydride terminated siloxane of Formula 2 is reacted with the phenol derivative of Formula 3 in the presence of a catalyst to synthesize the monohydroxyarylsiloxane compound of Formula 4.

The catalyst may be a platinum-based catalyst. For example, the catalyst may be platinum or a platinum-containing compound. There is no restriction on the kind of the catalyst. Exemplary catalysts include without limitation $H_2PtCl_6$, $Pt_2\{[(CH_2\!=\!CH)Me_2Si]_2O\}_3$, $Rh[(cod)_2]BF_4$, $Rh(PPh_3)_4Cl$, Pt/C and the like, and mixtures thereof. In exemplary embodiments, the catalyst is Pt/C, for example, 10% Pt/C.

The catalyst may be used in an amount of 10 to 500 ppm, for example 50 to 150 ppm based on the amount of the hydride terminated siloxane of Formula 2.

The reaction may be conducted in an organic solvent. There is no restriction on the kind of the organic solvent. For example, the organic solvent may be 1,2-dichloroethane, toluene, xylene, dichlorobenzene or a mixture thereof. In exemplary embodiments, the solvent includes toluene.

The reaction temperature and time may be determined depending on the reactivity between the compounds of Formulae 2 and 3. For example, the reaction temperature may be from 60 to 140° C., for example from 110 to 120° C., and the reaction time may be from 2 to 12 hr, for example from 3 to 5 hr.

The compound of Formula 4 may be purified for the next step or may be used in situ without further purification.

Second Step

In this step, the monohydroxyarylsiloxane compound of Formula 4 is reacted with a diene to prepare the bishydroxyarylsiloxane compound of Formula 1.

The diene may be a substituted or unsubstituted $C_1$-$C_{18}$ alkene or alkadiene, a substituted or unsubstituted $C_6$-$C_{18}$ cycloalkane, cycloalkene or cycloalkadiene, or a diene containing a substituted or unsubstituted $C_6$-$C_{18}$ aryl group. In exemplary embodiments, the diene is a substituted or unsubstituted $C_1$-$C_{10}$ alkene or alkadiene, a substituted or unsubstituted $C_6$-$C_{10}$ cycloalkane or cycloalkene or cycloalkadiene or substituted or unsubstituted $C_6$-$C_{10}$ aryl group. The substituent may be $C_1$-$C_6$ alkyl or $C_6$-$C_{18}$ aryl optionally including a double bond or a halogen atom. In exemplary embodiments, the substituent is a $C_1$-$C_6$ alkyl group optionally containing a double bond, for example a $C_1$-$C_3$ alkyl group optionally containing a double bond.

The compound of Formula 4, which may be used without further purification after completion of the first step, can be reacted with the diene in situ to prepare the bishydroxyarylsiloxane compound.

The temperature and time for the reaction between the monohydroxyarylsiloxane compound and the diene may be appropriately determined without limitation. For example, the reaction temperature and time employed in the second step may be the same as those employed in the first step.

The bishydroxyarylsiloxane compound can be purified by any suitable method known in the art. For example, after completion of the second step, the catalyst can be removed from the reaction mixture by filtration. Concentration of the filtrate removes the solvent and low molecular weight by-products, yielding the bishydroxyarylsiloxane compound of Formula 1. For a higher purity, the bishydroxyarylsiloxane compound may be further purified.

An exemplary method for the preparation of the bishydroxyarylsiloxane compound is depicted by Reaction Scheme 1:

wherein $R_1$, $R_2$, A, B, Z, Y and n are as defined above.

As depicted in Reaction Scheme 1, the phenol derivative is reacted with the hydride terminated siloxane in the presence of Pt/C as a catalyst to prepare the monohydroxyarylsiloxane compound, which is then reacted with the diene in the presence of the same catalyst to prepare the bishydroxyarylsiloxane compound.

The present invention further provides a copolymer including the bishydroxyarylsiloxane compound as a monomer. The copolymer may include at least one polymer such as but not limited to polycarbonate, polyphosphate, polyester, and the like, and combinations thereof. For example, the copolymer may include about 0.1 to about 50% by weight of the bishydroxyarylsiloxane compound and about 50 to 99.9% by weight of the polymer. The copolymer can be prepared by any suitable method known in the art.

Details of the present disclosure will be explained in more detail with reference to the following examples and preparative examples. Embodiments that are not included herein will be readily recognized and appreciated by those skilled in the art, and an explanation thereof is omitted.

EXAMPLES

Example 1

Preparation of Bishydroxyoligodimethylsiloxane A

Figure 1:
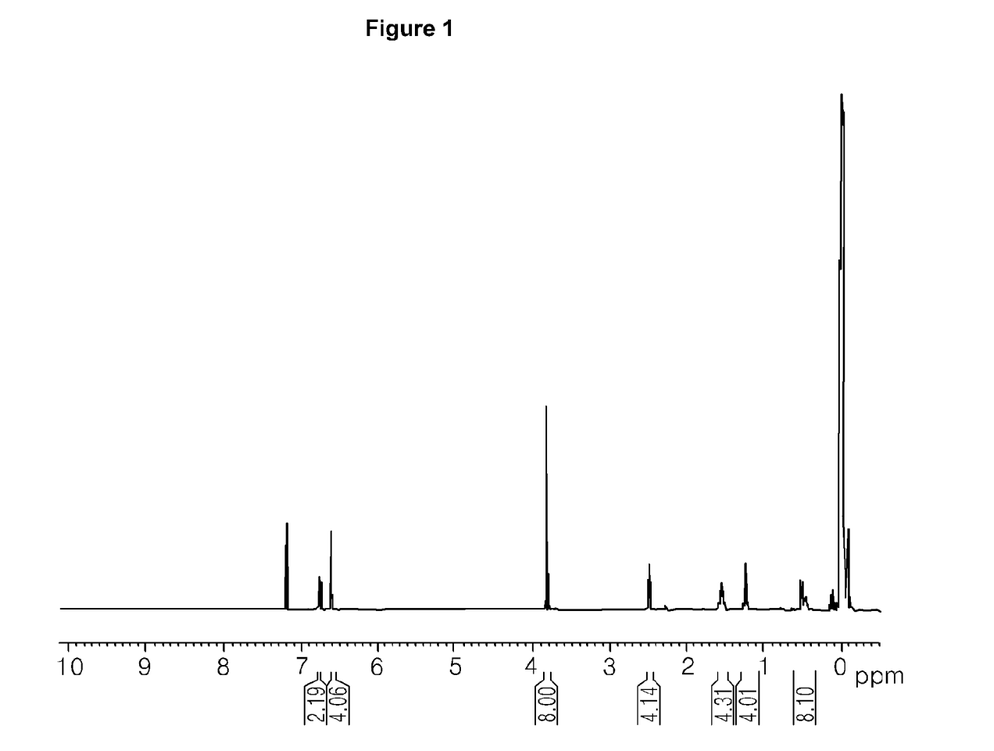
Figure 2:
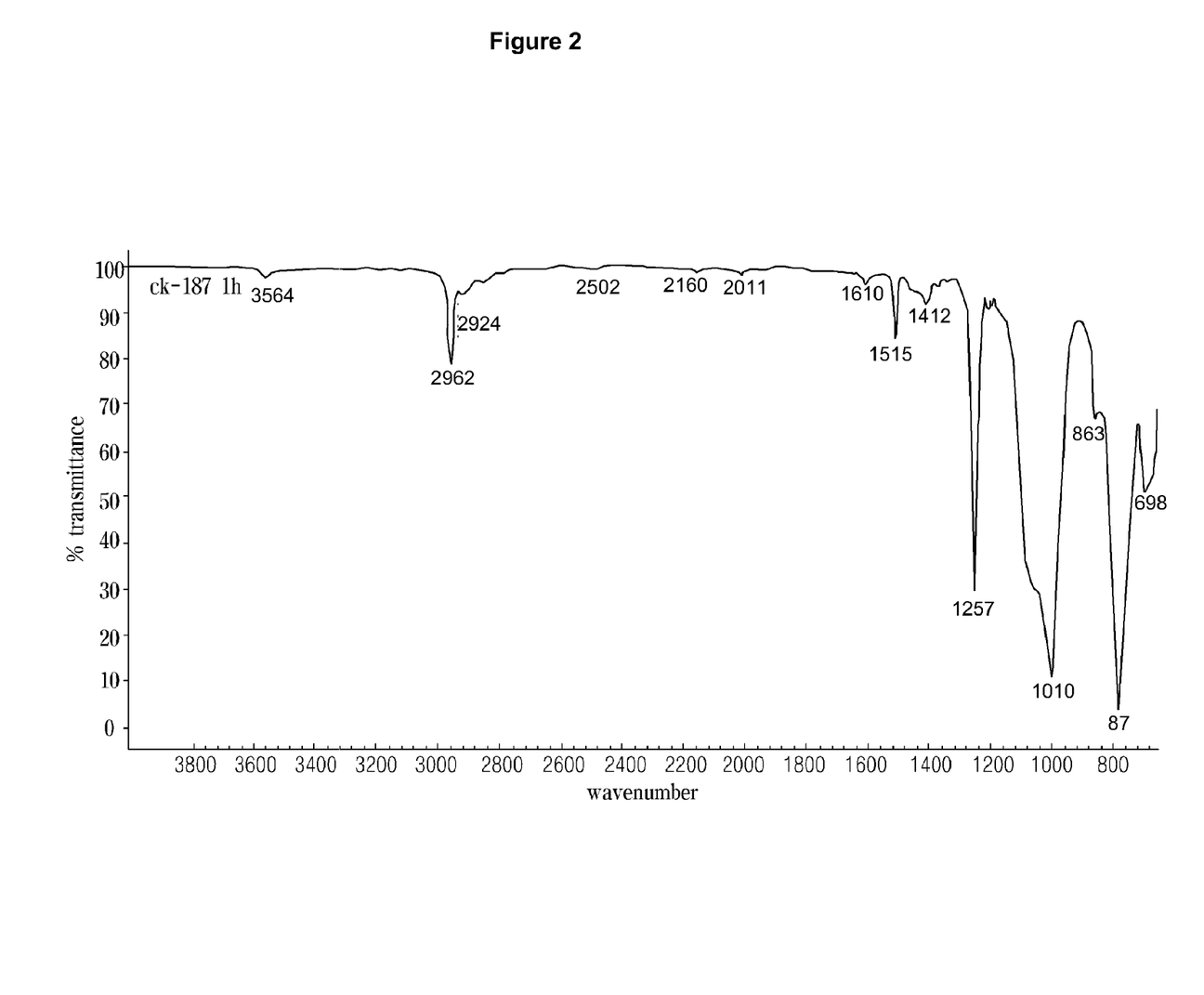

Octamethylcyclotetrasilane (344.5 g, 1.16 mol), tetramethyldisilane (52.0 g, 0.387 mol) and 500.0 ml of trifluoromethanesulfonic acid are stirred in a reactor at 25° C. for 24 hr, and then 14 g of MgO is added thereto. After stirring for 1 hr, the reaction mixture is filtered and concentrated under vacuum at high temperature to remove unreacted materials, yielding 300 g of an oligodimethylsiloxane compound. 0.5 g of Pt/C is added to 300 g of the oligodimethylsiloxane compound in 270 ml of toluene. After heating to 110° C. with stirring, a solution of eugenol (34.0 g, 0.21 mol) in 30 ml of toluene is slowly added dropwise. Thereafter, 1,5-hexadiene (9 g, 0.11 mol) is added dropwise. The reaction mixture is stirred at 110° C. for 1 hr and cooled to 25° C. The reaction mixture is filtered and concentrated under vacuum at high temperature to remove unreacted materials, yielding 330 g of bishydroxyoligodimethylsiloxane A as an oil. NMR and IR data for the product are shown in FIGS. 1 and 2.

Example 2

Preparation of Bishydroxyoligodimethylsiloxane B

Figure 3:
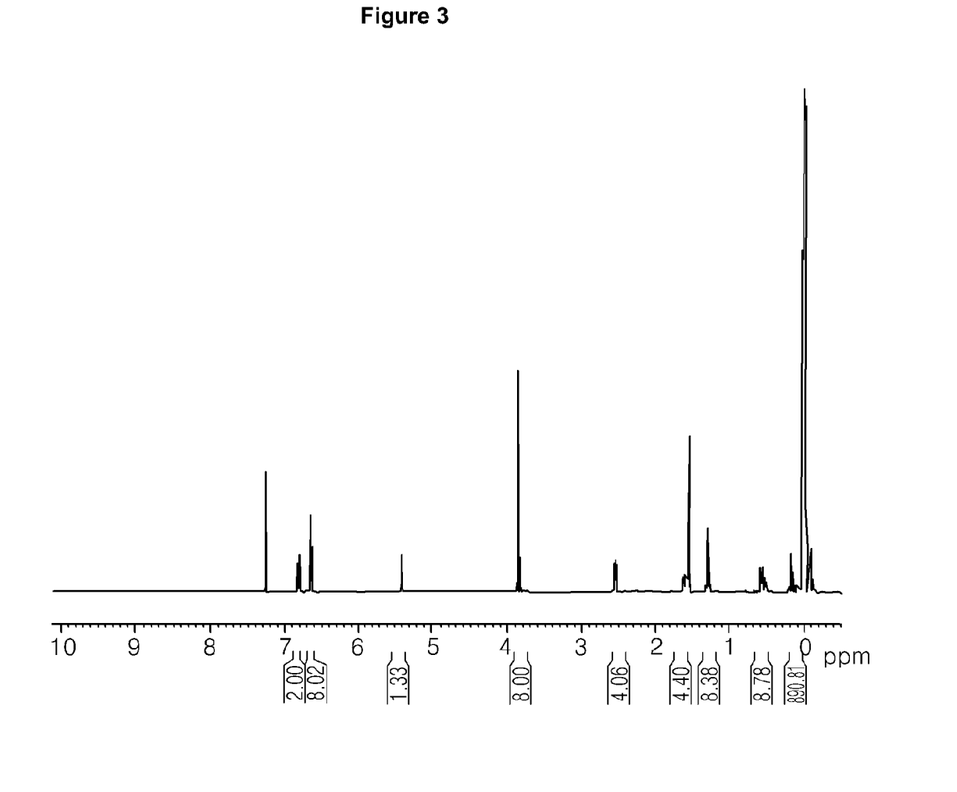
Figure 4:
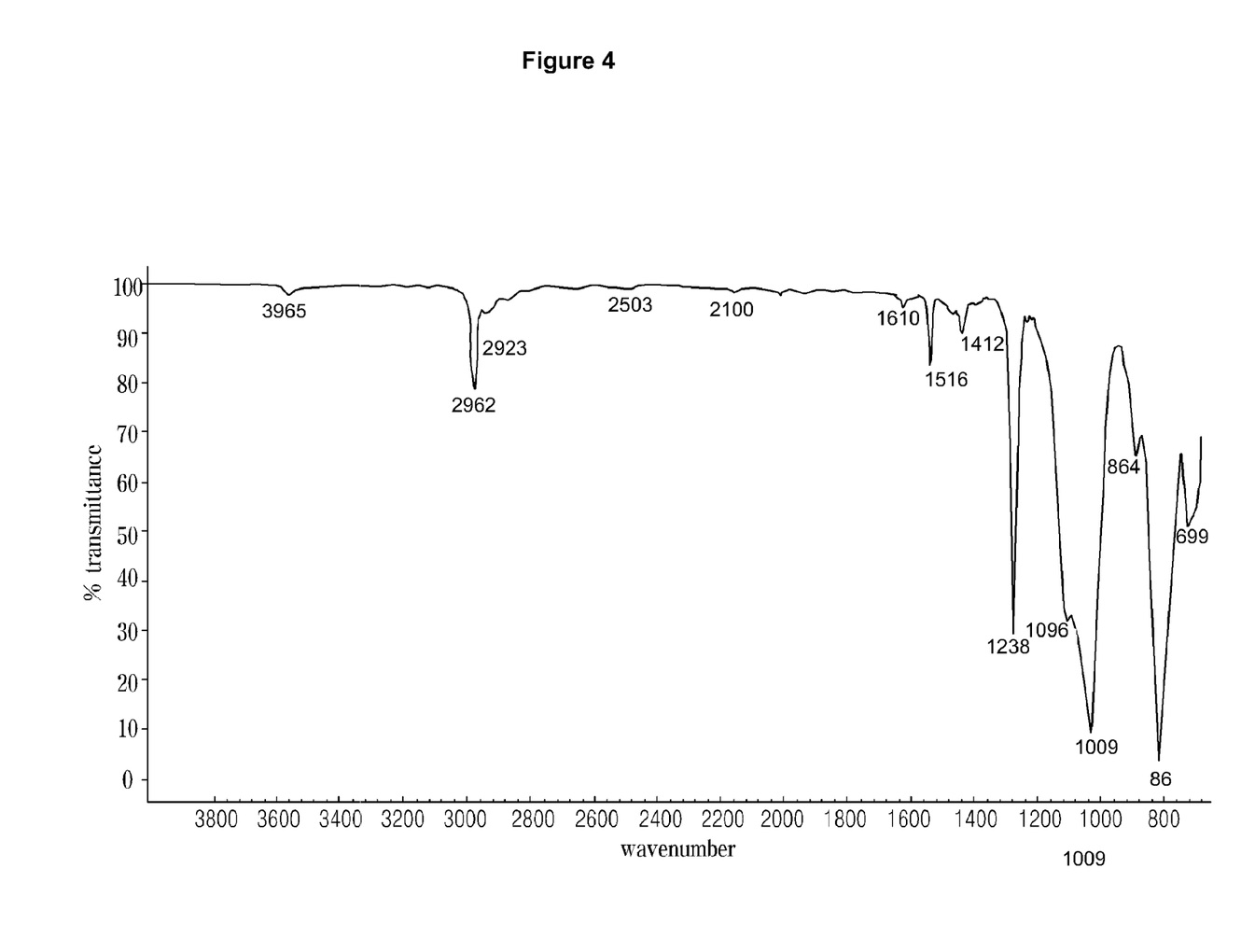

Bishydroxyoligodimethylsiloxane B is prepared in the same manner as in Example 1 except that 344.5 g (1.16 mol) of octamethylcyclotetrasilane and 26.0 g (0.193 mol) of tetramethyldisilane are used. NMR and IR data for the product are shown in FIGS. 3 and 4.

Example 3

Preparation of Bishydroxyoligodimethylsiloxane C

Figure 5:
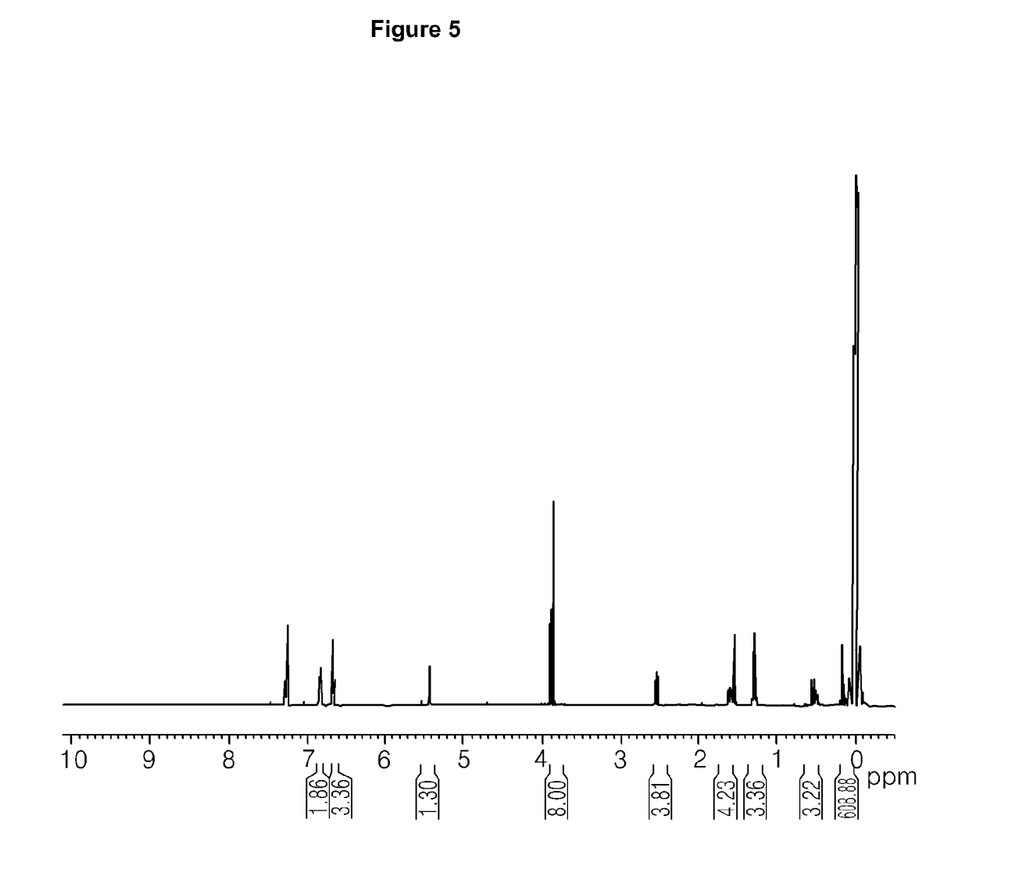
Figure 6:
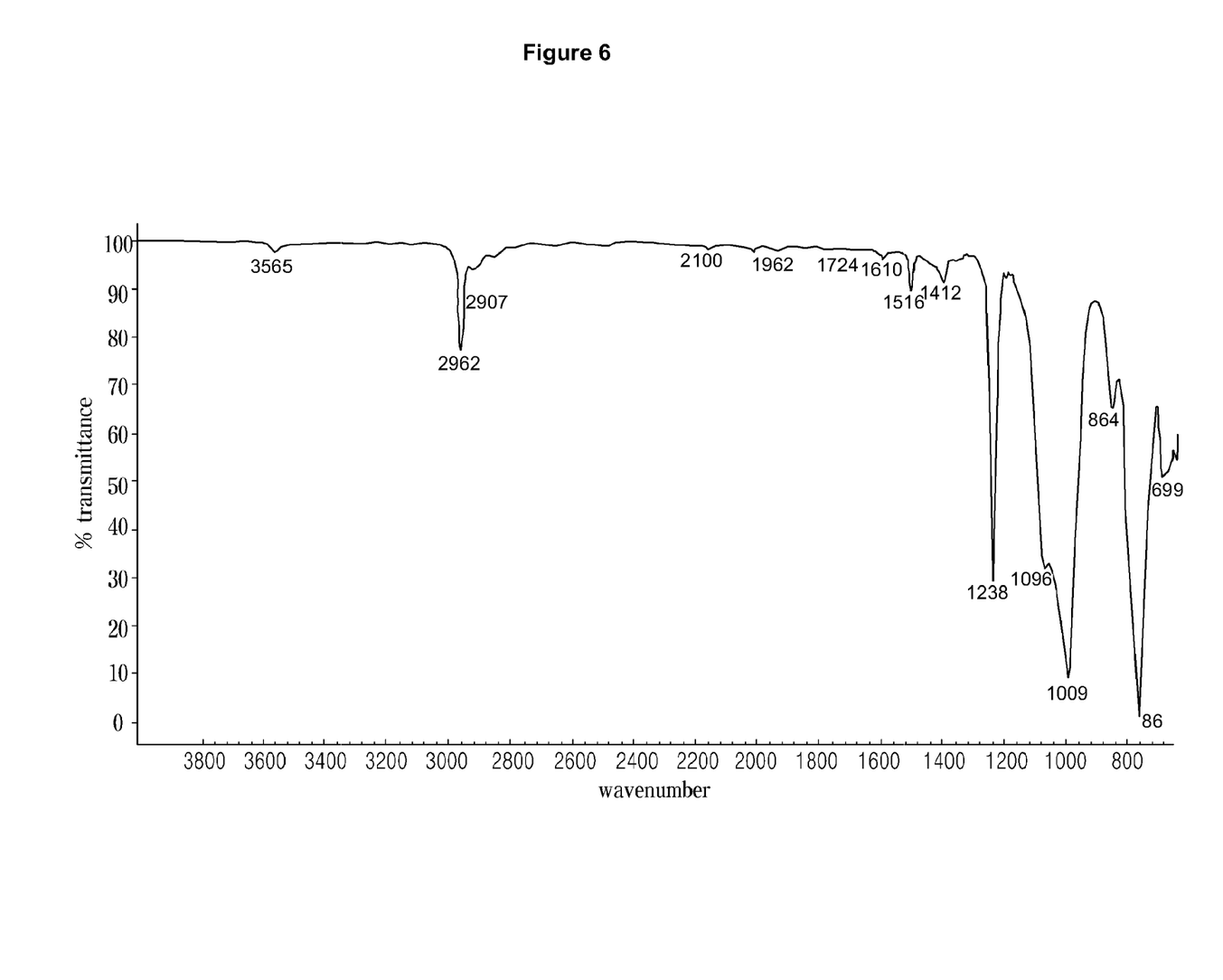

Bishydroxyoligodimethylsiloxane C is prepared in the same manner as in Example 1 except that 344.5 g (1.16 mol) of octamethylcyclotetrasilane and 18.0 g (0.134 mol) of tetramethyldisilane are used. NMR and IR data for the product are shown in FIGS. 5 and 6.

Example 4

Preparation of Bishydroxyoligodimethylsiloxane D

Figure 7:
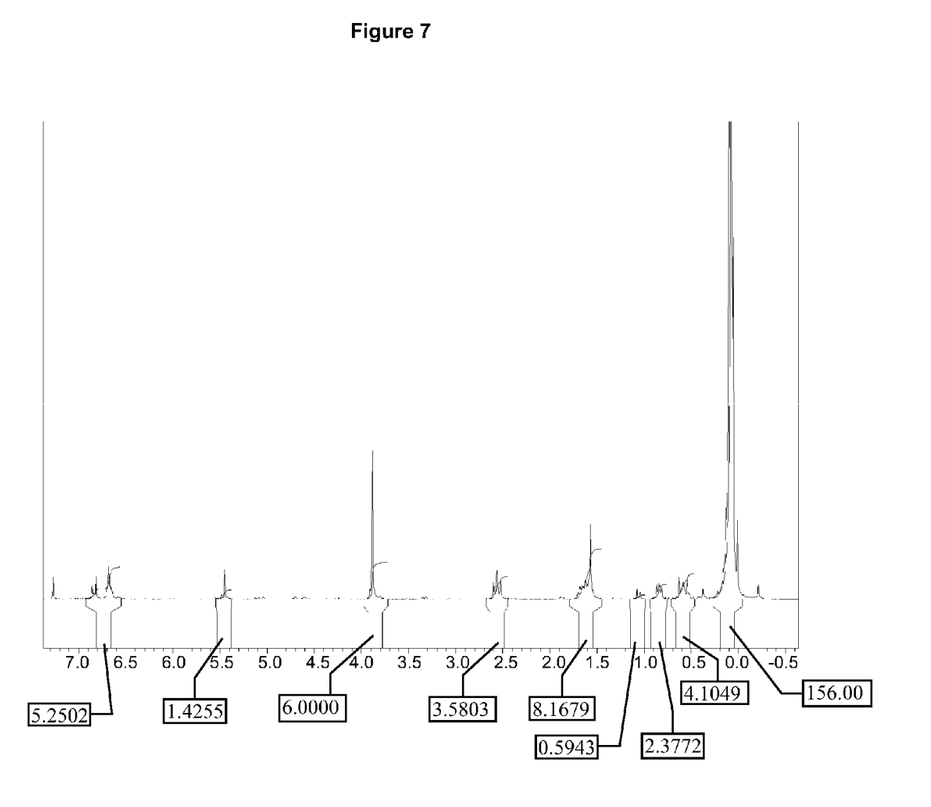
FIG. 7 is a $^1$H NMR spectrum of bishydroxyoligodimethylsiloxane D prepared in Example 4.

Bishydroxyoligodimethylsiloxane D is prepared in the same manner as in Example 1 except that 9 g (0.11 mol) of 2,3-dimethylbutadiene is used instead of 1,5-hexadiene. NMR data for the product are shown in FIG. 7.

Example 5

Preparation of Bishydroxyoligodimethylsiloxane E

Figure 8:
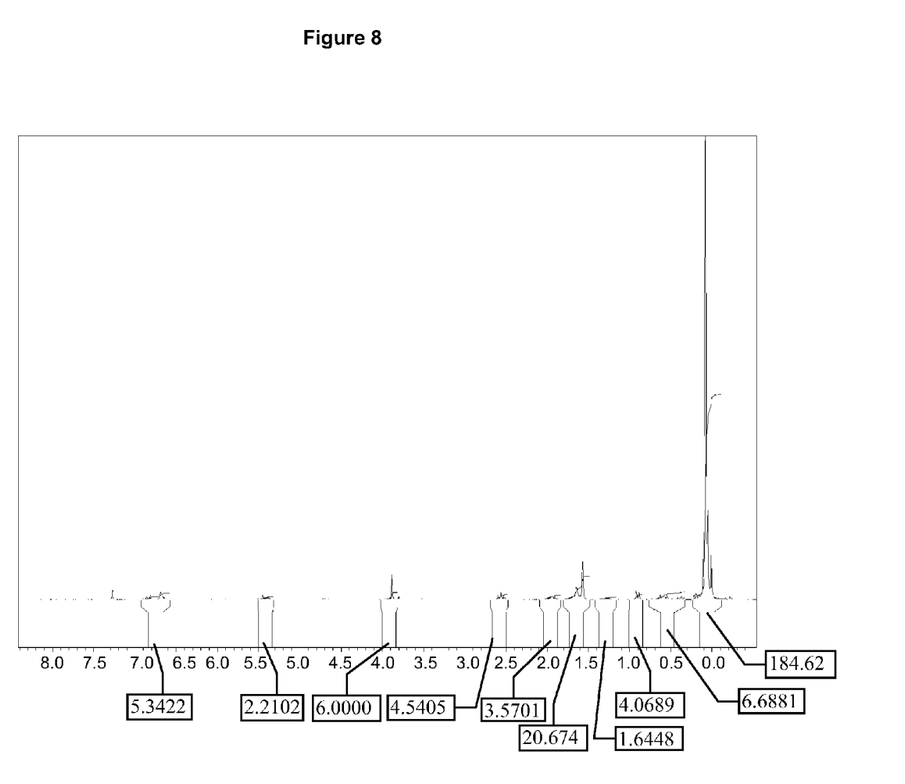
FIG. 8 is a $^1$H NMR spectrum of bishydroxyoligodimethylsiloxane E prepared in Example 5.

Bishydroxyoligodimethylsiloxane E is prepared in the same manner as in Example 1 except that 14.9 g (0.11 mol) of limonene is used instead of 1,5-hexadiene. NMR data for the product are shown in FIG. 8.

Preparative Example 1

Preparation of Bishydroxyoligodimethylsiloxane-polycarbonate copolymer 130 ml of a 9.1% aqueous solution of NaOH, 2,2-bis(4-hydroxyphenyl)propane (BPA) (21.1 g, 92.4 mmol) and methyltributylammonium chloride (1.3 g, 5.3 mmol) are reacted in 150 ml of methylene chloride with vigorous stirring in a reactor. The reaction mixture is maintained at a temperature of 20-25° C. 50 ml of a solution of triphosgene (10.1 g, 101.7 mmol) in methylene chloride is added to the reaction mixture and stirred for 10 min while maintaining the pH at 6-7. To the mixture is added a solution of bishydroxyoligodimethylsiloxane A (17.8 g, 6.9 mmol), which is prepared in Example 1, in 15 ml of methylene chloride. The resulting solution is stirred for 10 min while adding a 50% aqueous solution of NaOH to adjust the pH to 10-12. Thereafter, 2,2-bis(4-hydroxyphenyl)propane (84.7 g, 371.0 mmol), 150 ml of water and 150 ml of methylene chloride are added, followed by stirring for 1 hr. Triethylamine (1.0 g, 9.9 mmol) and para-cumylphenol (3.8 g, 17.9 mmol) are added. 200 ml of a solution of triphosgene (40.7 g, 411.6 mmol) in methylene chloride is slowly added to the reactor for 1 hr while adding a 50% aqueous solution of NaOH to adjust the pH to 10-12. After stirring is continued for 1 hr, the organic layer is separated, neutralized with a 10% aqueous solution of HCl, and washed several times with water until neutrality is reached. A portion of the solvents is removed from the organic layer and methanol is added to precipitate a polymer. The polymer is collected by filtration and dried. The polymer in the form of a powder is analyzed by diffusion ordered spectroscopy (DOSY). Results of the DOSY analysis show that bishydroxyoligodimethylsiloxane A is bound to the backbone of the polycarbonate. GPC analysis shows that the polymer has a weight average molecular weight ($M_w$) of 21,248 g/mol.

Preparative Example 2

Preparation of Bishydroxyoligodimethylsiloxane-polyphosphate Copolymer

2,2-Bis(4-hydroxyphenyl)propane (10.0 g, 43.8 mmol), bishydroxyoligodimethylsiloxane A (1.78 g, 0.69 mmol) prepared in Example 1, phenol (0.41 g, 4.38 mmol) and triphenylbenzylphosphonium chloride (0.46 g, 1.18 mmol) are reacted in 100 ml of a 9.1% aqueous solution of KOH. The reaction solution is cooled to −5° C. with stirring. To the reaction solution is added dropwise a solution of benzyl phosphonyl dichloride (8.51 g, 43.8 mmol) in 200 ml of methylene chloride for 30 min. The reaction mixture is stirred at 0° C. for 2 hr. The reaction mixture is diluted with 1 L of methylene chloride and washed sequentially with 1 L of a 1 N aqueous solution of hydrochloric acid (×2) and 1 L of distilled water (×2). The methylene chloride layer is separated and concentrated under reduced pressure. The addition of hexane to the concentrate afforded a bishydroxyoligodimethylsiloxane A-polyphosphate copolymer as a white solid precipitate in a yield of 92%. GPC analysis shows that the copolymer has a weight average molecular weight ($M_w$) of 6,100 g/mol.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A bishydroxyarylsiloxane compound represented by Formula 1:

wherein:

$R_1$ and $R_2$ are each independently $C_1$-$C_{10}$ alkyl or $C_6$-$C_{18}$ aryl, optionally substituted with halogen or $C_1$-$C_6$ alkoxy, each A is independently $C_1$-$C_{10}$ alkylene or $C_6$-$C_{18}$ arylene, optionally including —O— or —S—, Z is $C_4$-$C_{18}$ alkylene, $C_6$-$C_{18}$ cycloalkylene or ethylene disubstituted $C_6$-$C_{18}$ arylene, optionally substituted with $C_1$-$C_6$ alkyl, $C_6$-$C_{18}$ aryl, or halogen, each Y is independently hydrogen, halogen, $C_1$-$C_{18}$ alkoxy, $C_1$-$C_{10}$ alkyl or $C_6$-$C_{18}$ aryl, and each n is independently an integer from 4 to 100.

2. The bishydroxyarylsiloxane compound according to claim 1, wherein $R_1$ and $R_2$ are $C_1$-$C_6$ alkyl.

3. The bishydroxyarylsiloxane compound according to claim 2, wherein $R_1$ and $R_2$ are $C_1$-$C_3$ alkyl.

4. The bishydroxyarylsiloxane compound according to claim 1, wherein each A is $C_1$-$C_6$ alkylene.

5. The bishydroxyarylsiloxane compound according to claim 4, wherein each A is $C_1$-$C_3$ alkylene.

6. The bishydroxyarylsiloxane compound according to claim 1, wherein Z is $C_4$-$C_{10}$ alkylene, $C_6$-$C_{10}$ cycloalkylene or ethylene disubstituted $C_6$-$C_{10}$ arylene, optionally substituted with $C_1$-$C_6$ alkyl.

7. The bishydroxyarylsiloxane compound according to claim 6, wherein Z is $C_4$-$C_{10}$ alkylene.

8. The bishydroxyarylsiloxane compound according to claim 6, wherein Z is $C_6$-$C_{10}$ cycloalkylene.

9. The bishydroxyarylsiloxane compound according to claim 6, wherein Z is ethylene disubstituted $C_6$-$C_{10}$ arylene.

10. The bishydroxyarylsiloxane compound according to claim 1, wherein each Y is hydrogen or $C_1$-$C_3$ alkoxy.

11. The bishydroxyarylsiloxane compound according to claim 10, wherein each Y is hydrogen or methoxy.

12. The bishydroxyarylsiloxane compound according to claim 1, comprising

13. The bishydroxyarylsiloxane compound according to claim 1, comprising

14. The bishydroxyarylsiloxane compound according to claim 1, comprising

15. The bishydroxyarylsiloxane compound according to claim 1, comprising

16. The bishydroxyarylsiloxane compound according to claim 1, comprising

17. The bishydroxyarylsiloxane compound according to claim 1, comprising

18. A method for preparing a bishydroxyarylsiloxane compound of Formula 1:

(1)

wherein $R_1$ and $R_2$ are each independently $C_1$-$C_{10}$ alkyl or $C_6$-$C_{18}$ aryl, optionally substituted with halogen or $C_1$-$C_6$ alkoxy, each A is independently $C_1$-$C_{10}$ alkylene or $C_6$-$C_{18}$ arylene, optionally including —O— or —S—, Z is $C_4$-$C_{18}$ alkylene, $C_6$-$C_{18}$ cycloalkylene or ethylene disubstituted $C_6$-$C_{18}$ arylene, optionally substituted with $C_1$-$C_6$ alkyl, $C_6$-$C_{18}$ aryl, or halogen, each Y is independently hydrogen, halogen, $C_1$-$C_{18}$ alkoxy, $C_1$-$C_{10}$ alkyl or $C_6$-$C_{18}$ aryl, and each n is independently an integer from 4 to 100, the method comprising:

reacting a hydride terminated siloxane represented by Formula 2:

(2)

wherein $R_1$, $R_2$ and n are as defined in Formula 1, with a phenol derivative represented by Formula 3:

(3)

wherein B is $C_1$-$C_{10}$ alkylene or $C_6$-$C_{18}$ arylene having a terminal double bond, optionally including —O— or —S— and Y is as defined in Formula 1, to synthesize a monohydroxyarylsiloxane compound represented by Formula 4:

(4)

wherein $R_1$, $R_2$, A, Y and n are as defined in Formula 1; and reacting the monohydroxyarylsiloxane compound with a diene.

19. A copolymer comprising the bishydroxyarylsiloxane compound according to claim 1 as a monomer.

20. The copolymer according to claim 19, wherein the copolymer comprises at least one polymer selected from the group consisting of polycarbonate, polyphosphate and polyester.

21. the bishydroxyarylsiloxane compound according to claim 1, comprising 22. the bishydroxyarylsiloxane compound according to claim 1, comprising

* * * * *